United States Patent
Gorin et al.

(10) Patent No.: US 7,440,893 B1
(45) Date of Patent: *Oct. 21, 2008

(54) AUTOMATED DIALOG METHOD WITH FIRST AND SECOND THRESHOLDS FOR ADAPTED DIALOG STRATEGY

(75) Inventors: Allen Louis Gorin, Berkeley Heights, NJ (US); Irene Langkilde Geary, Los Angeles, CA (US); Marilyn Ann Walker, Morristown, NJ (US); Jeremy H. Wright, Warren, NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/219,630

(22) Filed: Sep. 6, 2005

Related U.S. Application Data

(63) Continuation of application No. 09/765,444, filed on Jan. 22, 2001, now Pat. No. 7,003,459, and a continuation-in-part of application No. 09/712,194, filed on Nov. 15, 2000, now Pat. No. 6,941,266.

(51) Int. Cl.
*G10L 15/22* (2006.01)
(52) U.S. Cl. .................... 704/240; 704/275
(58) Field of Classification Search ............... 704/231, 704/236, 240, 270, 275; 379/88.01
See application file for complete search history.

(56) References Cited

U.S. PATENT DOCUMENTS

| | | | |
|---|---|---|---|
| 4,777,600 A | 10/1988 | Saito et al. | |
| 4,866,778 A | 9/1989 | Baker | |
| 4,903,305 A | 2/1990 | Gillick et al. | |
| 5,029,214 A | 7/1991 | Hollander | |
| 5,033,088 A | 7/1991 | Shipman | |
| 5,099,425 A | 3/1992 | Kanno et al. | |
| 5,384,892 A | 1/1995 | Strong | |
| 5,390,272 A | 2/1995 | Repta et al. | |
| 5,434,906 A | 7/1995 | Robinson et al. | |
| 5,457,768 A | 10/1995 | Tsuboi et al. | |
| 5,621,859 A * | 4/1997 | Schwartz et al. | 704/256 |
| 5,638,425 A * | 6/1997 | Meador et al. | 379/88.01 |
| 5,664,058 A * | 9/1997 | Vysotsky | 704/243 |
| 5,666,400 A | 9/1997 | McAllister et al. | |
| 5,675,707 A * | 10/1997 | Gorin et al. | 704/257 |

(Continued)

OTHER PUBLICATIONS

A.L. Gorin et al. "How May I Help You?", Speech Communication 23 (1997) 113-127, Elsevier.

(Continued)

*Primary Examiner*—Martin Lerner

(57) ABSTRACT

This invention concerns a method and system for monitoring an automated dialog system for the automatic recognition of language understanding errors based on a user's input communications. The method illustratively determines whether a probability of understanding the user's input communication exceeds a first threshold. If the first threshold is exceeded, further dialog is conducted with the user. Otherwise, the user may be directed to a human for assistance. The method also illustratively determines whether the probability also exceeds a second threshold, the second threshold being higher than the first. If so, then further dialog is conducted with the user using the current dialog strategy. However, if the probability falls between a first threshold and a second threshold, the dialog strategy may be adapted in order to improve the chances of conducting a successful dialog with the user.

7 Claims, 6 Drawing Sheets

U.S. PATENT DOCUMENTS

| | | | |
|---|---|---|---|
| 5,719,921 | A | 2/1998 | Vysotsky et al. |
| 5,737,724 | A * | 4/1998 | Atal et al. .................... 704/251 |
| 5,794,193 | A | 8/1998 | Gorin et al. |
| 5,839,106 | A | 11/1998 | Bellegarda |
| 5,854,999 | A * | 12/1998 | Hirayama .................... 704/226 |
| 5,860,063 | A | 1/1999 | Gorin et al. |
| 5,905,774 | A | 5/1999 | Tatchell et al. |
| 5,995,664 | A * | 11/1999 | Shimomura .................. 382/229 |
| 6,021,384 | A | 2/2000 | Gorin et al. |
| 6,023,673 | A | 2/2000 | Bakis et al. |
| 6,044,337 | A | 3/2000 | Gorin et al. |
| 6,094,476 | A * | 7/2000 | Hunt et al. ................ 379/88.04 |
| 6,134,527 | A * | 10/2000 | Meunier et al. ............. 704/247 |
| 6,173,261 | B1 | 1/2001 | Arai et al. |
| 6,173,266 | B1 | 1/2001 | Marx et al. |
| 6,185,528 | B1 * | 2/2001 | Fissore et al. ............... 704/232 |
| 6,192,110 | B1 | 2/2001 | Abella et al. |
| 6,236,968 | B1 | 5/2001 | Kanevsky et al. |
| 6,377,662 | B1 * | 4/2002 | Hunt et al. ................ 379/88.01 |
| 6,421,655 | B1 | 7/2002 | Horvitz et al. |
| 6,490,698 | B1 | 12/2002 | Horvitz et al. |
| 6,571,210 | B2 * | 5/2003 | Hon et al. .................... 704/251 |
| 6,681,206 | B1 | 1/2004 | Gorin et al. |
| 6,697,782 | B1 * | 2/2004 | Iso-Sipila et al. ........... 704/275 |
| 6,711,255 | B2 * | 3/2004 | Berrondo et al. ....... 379/266.06 |
| 6,751,508 | B2 * | 6/2004 | Sasaki et al. .................... 700/1 |
| 6,751,591 | B1 * | 6/2004 | Gorin et al. .................. 704/257 |
| 6,801,893 | B1 * | 10/2004 | Backfried et al. ........... 704/257 |
| 6,941,266 | B1 * | 9/2005 | Gorin et al. .................. 704/257 |
| 7,003,459 | B1 * | 2/2006 | Gorin et al. .................. 704/240 |
| 7,085,720 | B1 | 8/2006 | Gorin et al. |
| 7,127,395 | B1 * | 10/2006 | Gorin et al. .................. 704/257 |
| 7,158,935 | B1 * | 1/2007 | Gorin et al. .................. 704/257 |
| 7,286,984 | B1 * | 10/2007 | Gorin et al. .................. 704/243 |
| 2003/0236664 | A1 * | 12/2003 | Sharma ....................... 704/251 |
| 2004/0107099 | A1 * | 6/2004 | Charlet ........................ 704/234 |
| 2006/0149544 | A1 * | 7/2006 | Hakkani-Tur et al. ........ 704/236 |

OTHER PUBLICATIONS

Automatic Prediction of Problematic Human-Computer Dialogues in "How May I Help You?", I. Langkilde, M. Walker, J. Wright, A. Gorin and D. Litman, AT&T Labs—Research, Florham Park, NJ, Dec. 12, 1999.

Diane J. Litman, Marilyn A. Walker and Michail S. Kearns, Automatic Detection of Poor Speech Recognition at the Dialogue Level, Proceedings of the 37th Annual Meeting of the Association of Computational Linguistics, ACL99, Jun. 1999, pp. 309 316.

Andreas Stolcke et al., Dialogue Act Modeling for Automatic Tagging and Recognition of Conversational Speech, Association f Computational Linguistics, Sep. 2000, pp. 339-373.

Christian Janssen, Anette Weisbecker, Jurgen Ziergler, Generating User Interfaces from Data Models and Dialogue Net Specifications, Proceedings of the SIGCHI Conference on Human Factors in Computing Systems, Apr. 24-29, 1993, pp. 418 423.

U.S. Appl. No. 09/699,494, filed Oct. 31, 2000, Gorin et al., Pending.
U.S. Appl. No. 09/699,495, filed Oct. 31, 2000, Gorin et al., Pending.
U.S. Appl. No. 09/699,496, filed Oct. 13, 2000, Abella et al., Pending.

* cited by examiner

US 7,440,893 B1

AUTOMATED DIALOG METHOD WITH FIRST AND SECOND THRESHOLDS FOR ADAPTED DIALOG STRATEGY

CROSS REFERENCE TO RELATED APPLICATIONS

This is a continuation-in-part of U.S. patent application Ser. No. 09/712,194 filed Jan. 15, 2000, now U.S. Pat. No. 6,941,266, and is also a continuation of U.S. patent application Ser. No. 09/765,444 filed Jan. 22, 2001, now U.S. Pat. No. 7,003,459 issued Feb. 11, 2006.

TECHNICAL FIELD

The invention relates to automated systems for communication recognition and understanding.

BACKGROUND OF THE INVENTION

Today there are many automated dialog systems in operation that serve many purposes, such as for customer care. Because they limit human involvement, such systems save millions of dollars in labor costs. Examples of such systems are shown in U.S. Pat. Nos. 5,675,707, 5,860,063, 6,044,337, and 6,173,261, and U.S. patent application Ser. Nos. 08/943,944, filed Oct. 3, 1997, 09/699,494, 09/699,495, and 09/699,496 all filed Oct. 31, 2000, and 09/712,192 and 09/712,194, both filed Nov. 15, 2000, each of which is incorporated by reference herein in its entirety.

While it has recently become possible to build spoken dialog systems that interact with users in real-time in a range of domains, systems that support conversational natural language are still subject to a large number of language understanding errors. Endowing such systems with the ability to reliably distinguish language understanding errors from correctly understood communications might allow them to correct some errors automatically or to interact with users to repair them, thereby improving the system's overall performance.

SUMMARY OF THE INVENTION

This invention concerns a method and system for monitoring an automated dialog system for the automatic recognition of language understanding errors based on a user's input communications. The method may include determining whether a probability of understanding the user's input communication exceeds a first threshold. The method may further operate such that if the first threshold is exceeded, further dialog is conducted with the user. Otherwise, the user may be directed to a human for assistance.

In another possible embodiment, the method operates as above except that if the probability exceeds a second threshold, the second threshold being higher than the first, then further dialog is conducted with the user using the current dialog strategy. However, if the probability falls between a first threshold and a second threshold, the dialog strategy may be adapted in order to improve the chances of conducting a successful dialog with the user.

This process may be cumulative. In particular, the first dialog exchange may be stored in a database. Then, a second dialog exchange is conducted with the user. As a result, a second determination is made as to whether the user's input communication can be understood can be conducted based on the stored first exchange and the current second exchanges. This cumulative process may continue using a third and fourth exchange, if necessary.

BRIEF DESCRIPTION OF THE DRAWINGS

The invention is described in detail with reference to the following drawings wherein like numerals reference like elements, and wherein.

DETAILED DESCRIPTION OF THE PREFERRED EMBODIMENTS

Figure 1:
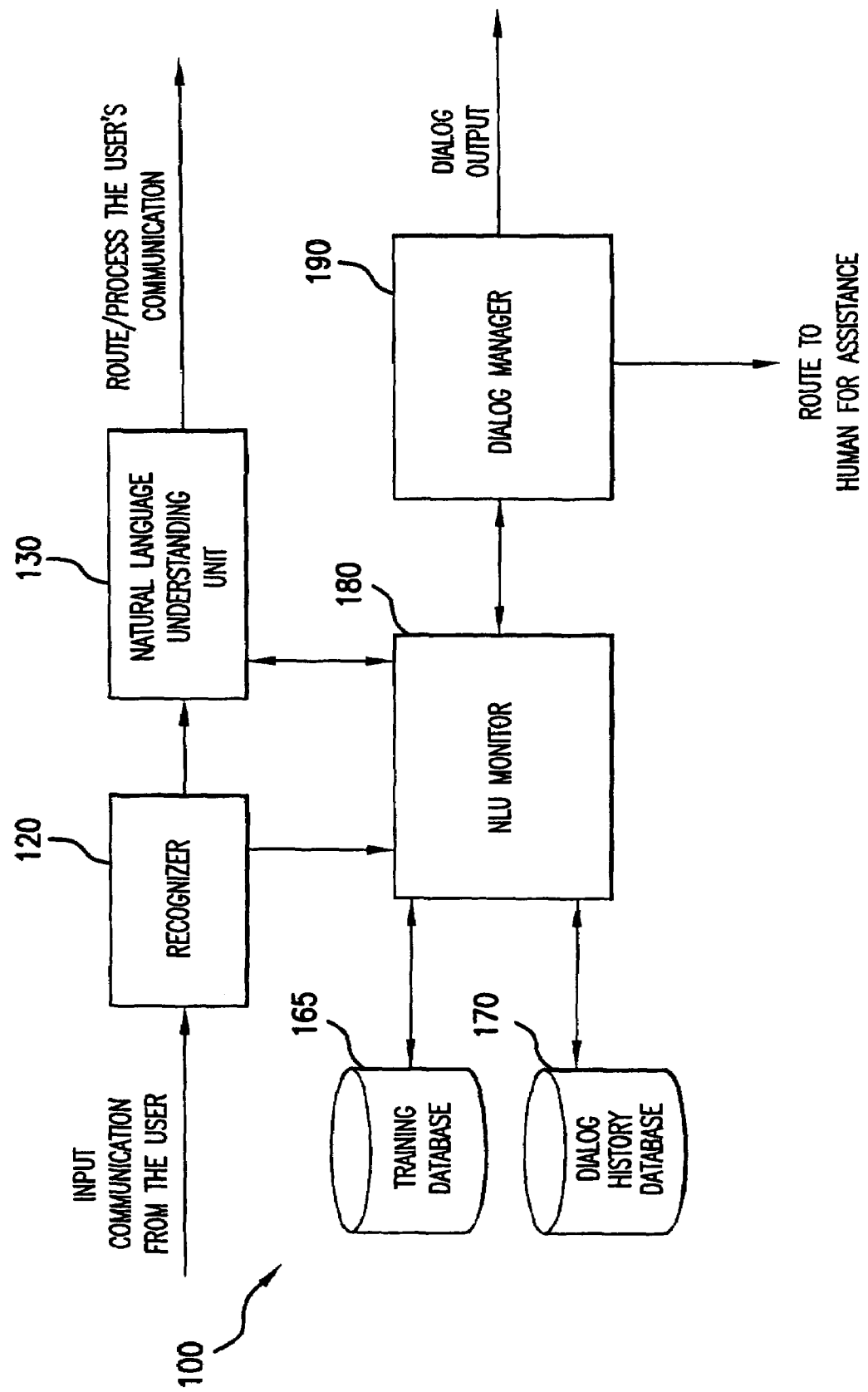
FIG. 1 is a block diagram of an exemplary NLU monitoring system.

Automated dialog systems promise efficient and natural access to a large variety of information sources and services from any communication device, such as telephones, cellular or mobile phones, computers, videophones, etc. Several hundred systems that support system-initiative dialogs are currently being field-tested and deployed. However, systems that support mixed-initiative, conversational, natural language interaction are still subject to a large number of language understanding errors, which have a large impact on the system's performance.

This invention concerns monitoring an automated dialog system for the automatic recognition of language understanding errors. The ability to recognize and predict language understanding errors will endow an automated system with the ability to correct some errors automatically or to interact with users to repair them.

As an example of the benefit of error detection, contrast the exemplary dialogs below between human users and first, a conventional dialog system, and then a dialog system including the features of the present invention (the phone numbers, card numbers, and pin numbers in the sample dialogs are artificial.):

Dialog Failure (Failure to Complete the User's Intended Task)

S1: AT&T How may I help you?

U1: (silence)

S2: Sorry. Please briefly tell me how I may help you?

U2: I wanta find out how much my bill's worth.

S3: What phone number would you like the call billed to?

U3: Um the access number.

S4: Sorry. Could I have that phone number again?

U4: 1 8 hundred 2 2 5 5 2 8 8.

S5: What number would you like to call?

U5: 800 225 5288 (touchtone input)

S6: Thank you.

The conventional dialog system frequently does not detect that an NLU error has occurred. The conventional dialog system misunderstands the user's utterance in U2 as a request to make a third-number call. The system continues the dialog with utterance S3 by asking which number the user would like to bill the call to. The dialog ends without completing the user's task.

Sample Successful Dialog

S1: AT&T How may I help you?

U1: I need to [uh] put a call on my calling card please

S2: May I have your card number, please?

U2: 7 6 5 4 3 2 1 0 9 8 7 6 5 4

S3: What number would you like to call?

U3: 8 1 4 7 7 7 6 6 6 6 (misunderstood)

S4: May I have that number again?

U4: 8 1 4 7 7 7 6 6 6 6

S5: Thank you.

In contrast, the system of the invention completed the above dialog successfully. Note that after detecting the NLU error in utterance U3, the system of the invention re-prompts the user to repeat the calling card number in utterance S4.

While the above example illustrates the invention in a telephone customer care system, this invention may be applied to any single mode, or multimodal, dialog system. Furthermore, the invention may apply to any automated recognition and understanding system that receives communications from external sources, such as users, customers, service providers, associates, etc. Consequently, the method may operate in conjunction with one or more communication networks, including a telephone network, the Internet, an intranet, Cable TV network, a local area network (LAN), a wireless communication network, etc.

In the discussion below, the term "natural language understanding" is used to describe the understanding of any form of communications received over the networks which may be expressed verbally, nonverbally, multimodally, etc. Examples of nonverbal communications include the use of gestures, body movements, head movements, non-responses, text, keyboard entries, keypad entries, mouse clicks, DTMF codes, pointers, stylus, cable set-top box entries, graphical user interface entries, touchscreen entries, etc. Multimodal communications involve communications on a plurality of channels, such as aural, visual, etc. However, for ease of discussion, examples and discussions of the method and system of the invention will be discussed below in relation to telephone systems.

FIG. 1 illustrates an exemplary natural language understanding monitoring system 100. The natural language understanding monitoring system 100 includes a natural language understanding (NLU) monitor 180, a dialog manager 190, a training database 165 and a dialog history database 170. The NLU monitor 180 receives recognition data from a recognizer 120 and understanding data from a natural language understanding (NLU) unit 130 that are based on input communications from the user.

The recognizer 120 and the NLU unit 130 are shown as separate units for clarification purposes. However, the functions of the recognizer 120 and the NLU unit 130 may be performed by a single unit within the spirit and scope of this invention.

The recognizer 120 and the NLU unit 130 may operate using one or more of a variety of recognition and understanding algorithms. For example, the recognizer 120 and the NLU unit 130 may use confidence functions to determine whether the user's input communications have been recognized and understood. The recognition and understanding data from the user's input communication are also input into the NLU monitor 180. Based on this data, the NLU monitor 180 calculates a probability that the language is understood clearly and this may be used in conjunction with other mechanisms like recognition confidence scores to decide whether and/or how to further process the user's communication.

As a result, if the user's input communication can be satisfactorily recognized and understood, the NLU unit 130 routes and/or processes the user's input communication, which may include the request, comment, etc. However, if the NLU monitor 180 recognizes errors in the understanding of the user's input communication such that it cannot be satisfactorily recognized and understood, dialog with the user may need to be conducted. This process will be described in greater detail below.

In the natural language understanding monitoring system 100, the dialog history database 170 serves as a database for storing each dialog exchange for a particular dialog. The training database 165 stores NLU errors collected from interactions with human users and models built based on those errors, the NLU features identified from the collected dialogs, and the NLU rules generated from the dialogs and the NLU features. The NLU monitor 180 exploits the training database 165 by using the dialog history stored in the dialog history database 170 to predict whether a NLU error is to occur in the current dialog. While the training database 165 and the dialog history database 170 are shown as separate databases in the exemplary embodiments, the dialog history and training data may be stored in the same database or memory, for example. This database or memory may be stored external or internal to the system.

As discussed below, the NLU monitor 180 of the natural language understanding monitoring system 100 can be trained to improve its ability to detect errors by exploiting language understanding errors collected in interactions with human users and stored in the training database 165. The initial segments of these dialogs can be used to predict that a problem is likely to occur. The ability to predict language understanding errors will allow the system's dialog manager 190 to apply more sophisticated strategies to repairing problems, and even perhaps, to prevent them.

Note that the recognizer 120 may be trained to recognize any number of communication symbols, both acoustic and non-acoustic, including grammar fragments, meaningful words, meaningful phrases, meaningful phrase clusters, superwords, morphemes, multimodal signals, etc., using any of the methods known to one skilled in the art including those found in U.S. Pat. Nos. 5,675,707, 5,860,063 and 6,044,337, and U.S. patent application Ser. Nos. 08/943,944, 09/712,192 and 09/712,194, as discussed above.

In describing the invention, three classes of NLU outcomes are distinguished: RCORRECT, a correctly understood utterance; RPARTIAL-MATCH, a partially understood utterance; and RMISMATCH a misunderstood utterance. Experiments were conducted on learning to automatically distinguish these three classes of NLU outcomes in 11,787 spoken utterances collected in a field trials system interacting with live customer traffic.

During the trial, the behaviors of all the system's 100 components were automatically recorded in a log file and the dialogs were later transcribed by humans and labeled with one or more of the categories representing the intended result/task that the caller was asking the system 100 to perform, on a per communication basis. This label will be referred to as the HUMAN LABEL.

The NLU unit 130 also logged what it believed to be the correct task category. This label will be referred to as the NLU LABEL. One of the focuses of this invention is on the problem of improving the system's 100 ability to automatically detect when the NLU LABEL is wrong. As mentioned above, this ability would allow the system 100 to make better decisions about when to transfer to a human customer care agent, but it might also support repairing such misunderstandings, either automatically or by interacting with a human caller.

The experiments reported here primarily utilize a rule learning program to automatically induce an NLU error classification model from the 11,787 utterances in the corpus. While other learning methods may be used within the spirit and scope of the invention, the experiments and examples discussed below utilized if-then rules that are used to express the learned classification model. For this purpose, if-then rules are easy to understand and would affect the ease with which the learned rules could be integrated back into the system 100.

In this classification, the names of a set of classes to be learned, the names and ranges of values of a fixed set of features, and training data specifying the class and feature values for each example in a training set, were input. As a result, a classification model for predicting the class of future examples was output. For exemplary purposes, the classification model is learned using greedy search guided by an information gain metric, and is expressed as an ordered set of if-then rules.

In application, the utterances in the corpus must be encoded in terms of a set of classes (the output classification) and a set of input features that are used as predictors for the classes. As mentioned above, three classes are distinguished based on comparing the NLU LABEL, the HUMAN LABEL and recognition results for card and telephone numbers: (1) RCORRECT: NLU correctly identified the task and any digit strings were also correctly recognized; (2) RPARTIAL-MATCH: NLU correctly recognized the task but there was an error in recognizing a calling card number or a phone number; (2) RMISMATCH: NLU did not correctly identify the user's task. The RCORRECT class accounts for 7481 (63.47%) of the utterances in the corpus. The RPARTIAL-MATCH accounts for 109 (0.1%) of the utterances, and the RMISMATCH class accounts for 4197 (35.6%) of the utterances.

Next, each utterance is encoded in terms of a set of 43 features that have the potential to be used during runtime to alter the course of the dialog. These features were either derived from prior encoding processes or from system 100. The system 100 components that we extracted features from were the recognizer 120, the NLU unit 130, and the dialog manager 190, along with a representation of the discourse history. Because the contribution of different system 100 components to the problem of predicting NLU error are to be examined, a classifier that had access to all the features is trained and its performance is compared to classifiers that only had access to recognizer 120 features, to NLU unit 130 features, and to discourse contextual features. Below we describe features obtained from each module:

Recognizer Features
   recog, recog-numwords, asr-duration, dtmf-flag, rg-modality, rg-grammar, tempo NLU Unit Features
   a confidence measure for all of the possible tasks that the user could be trying to do
   salience-coverage, inconsistency, context-shift, top-task, nexttop-task, top-confidence, diff-confidence, confpertime, salpertime Dialog Manager and Discourse History Features
   sys-LABEL, utt-id, prompt, reprompt, confirmation, subdial,
   discourse history: num-reprompts, num-confirms, num-subdials, reprompt %, confirmation %, subdialog %

The recognizer 120 takes the user's input communication and produces a transcription. The recognizer 120 features extracted from the corpus were the output of the recognizer 120 (recog), the number of words in the recognizer 120 output (recog-numwords), the duration in seconds of the input to the recognizer 120 (asr-duration), a flag for touchtone input (dtmf-flag), the input modality expected by the recognizer 120 (rg-modality) (one of: none, speech, touchtone, speech+touchtone, touchtone-card, speech+touchtone-card, touchtone-date, speech+touchtone-date, or none-final-prompt), and the grammar used by the recognizer 120 (rg-grammar). A feature called tempo was also calculated by dividing the value of the asr-duration feature by the recog-numwords feature.

The motivation for the recognizer 120 features is that any one of them may have impacted recognition performance with a concomitant effect on language understanding. For example, asr-duration has consistently been found to correlate with incorrect recognition. The name of the grammar (rg-grammar) could also be a predictor of NLU errors since it is well known that the larger the grammar, the more likely a recognizer 120 error is to occur.

One motivation for the tempo feature is that it has been found that users tend to slow down their communication (speech, movement, etc.) when the system 100 has misunderstood them. This strategy actually leads to more errors since the recognizer 120 is not trained on this type of communication. The tempo feature may also indicate hesitations, pauses or interruptions, which could also lead to recognizer 120 errors. On the other hand, additional multimodal input such as touchtone (DTMF) in combination with the user's communication, as encoded by the feature dtmf-flag, might increase the likelihood of understanding, since the touchtone input is unambiguous and will therefore function to constrain language understanding.

The goal of the NLU unit 130 module is to identify which of the possible results, tasks, etc. the user is attempting, and extract from the user's communication any items of information that are relevant to completing the user's intended result (e.g. a phone number is needed for the task dial for me). In this example, fifteen of the features from the NLU unit 130 represent the distribution for each of the 15 possible tasks of the NLU unit's 130 confidence in its belief that the user is attempting that task. Also included is a feature to represent which task has the highest confidence score (top-task), and which task has the second highest confidence score (nexttop-task), as well as the value of the highest confidence score (top-confidence), and the difference in values between the top and next-to-top confidence scores (diff-confidence).

Other features represent other aspects of the NLU unit 130 processing of the utterance. The inconsistency feature is an intra-utterance measure of semantic diversity, according to a task model of the domain. Some task classes occur together quite naturally within a single statement or request. For example, the dial for me task is compatible with the collect call task, but is not compatible with the billing credit task.

The salience-coverage feature measures the proportion of the utterance that is covered by the salient grammar fragments. For example, this may include the whole of a phone or card number if it occurs within a fragment. The context-shift feature is an inter-utterance measure of the extent of a shift of context away from the current task focus, caused by the appearance of salient phrases that are incompatible with it, according to a task model of the domain.

In addition, similar to the way we calculated the tempo feature, the salience-coverage and top-confidence features are normalized by dividing them by asr-duration to produce the salpertime and confpertime features. The motivation for these NLU features is to make use of information that the NLU unit 130 has as a result of processing the output of recognizer 120 and the current discourse context. For example, for utterances that follow the first utterance, the NLU unit 130 knows what task it believes the user is trying to complete. The context-shift feature incorporates this knowledge of the discourse history, with the motivation that if it appears that the caller has changed his/her mind, then the NLU unit 130 may have misunderstood an utterance.

The function of the dialog manager 190 is to take as input the output of the NLU unit 130, decide what task the user is trying to accomplish, decide what the system will say next, and update the discourse history. The dialog manager 190 decides whether it believes there is a single unambiguous task that the user is trying to accomplish, and how to resolve any ambiguity.

Features based on information that the dialog manager 190 logged about its decisions or features representing the on-going history of the dialog might also be useful predictors of NLU errors. Some of the potentially interesting dialog manager 190 events arise due to low NLU confidence levels computed by the NLU monitor 180 that lead the dialog manager 190 to reprompt the user or confirm its understanding. A re-prompt might be a variant of the same question that was asked before, or it could include asking the user to choose between two tasks that have been assigned similar confidences by the NLU monitor 180. For example, in the dialog below the system utterance in S3 counts as a re-prompt because it is a variant of the question in utterance S2.

S1: AT&T How may I help you?

U1: I need credit please.

S2: Okay. What is the reason for the credit?

U2: Miss, uh, Miss, different area code than I needed.

S3: Sorry. I need to know whether you need credit for a wrong number, bad connection or a call that was cut off. (re-prompt)

U3: It is a wrong number.

S4: What was the number that you dialed?

The features that are extracted from the dialog manager 190 are the task-type label, sys-label, whose set of values include a value to indicate when the system had insufficient information to decide on a specific task-type, the utterance id within the dialog (utt-id), the name of the prompt played to the user (prompt), and whether the type of prompt was a re-prompt (reprompt), a confirmation (confirm), or a subdialog prompt (a superset of the re-prompts and confirmation prompts (subdial)). The sys-label feature is intended to capture the fact that some tasks may be harder than others. The utt-id feature is motivated by the idea that the length of the dialog may be important, possibly in combination with other features like sys-label. The different prompt features again are motivated by results indicating that re-prompts are frustrating for users.

The discourse history features included running tallies for the number of re-prompts (num-reprompts), number of confirmation prompts (num-confirms), and number of subdialog prompts (num-subdials), that had been played before the utterance currently being processed, as well as running percentages (percent-reprompts, percent-confirms, percent-subdials). The use of running tallies and percentages is based on showing that normalized features are more likely to produce generalized predictors.

Figure 2:
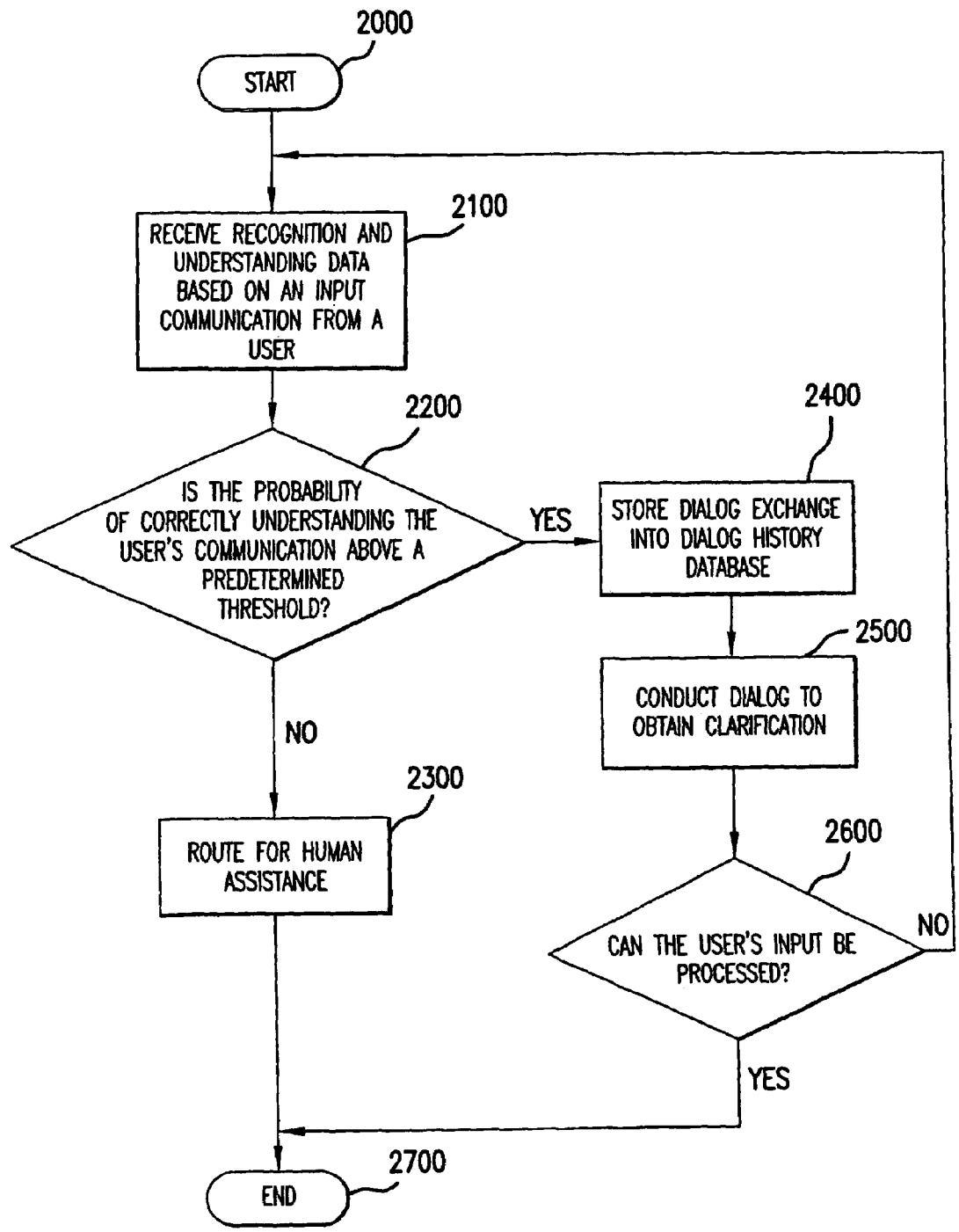
FIG. 2 is a flowchart illustrating an exemplary NLU monitoring process.

FIG. 2 is a flowchart of an exemplary natural language understanding monitoring process. The process begins its step 2000 and goes to step 2100 where the NLU monitor 180 receives recognition and understanding data from the recognizer 120 and the NLU unit 130, respectively, based on an input communication from a user. In step 2200, the NLU monitor 180 determines the probability of whether the user's input communication maybe correctly understood based on the initial dialog exchange data based on the recognition and understanding data received and the decision rules stored in the training database 165.

If the probability of correctly understanding the user's input communication determined by the NLU monitor 180 does not exceed a predetermined threshold, for example, the NLU monitor 180 signals the dialog manager 190 to route the user to a human for assistance. This situation may be represented by the following relationship:

$$t1 > P(\text{understanding})$$

If the probability of correctly understanding the user's input communication determined by the NLU monitor 180 exceeds the predetermined threshold, for example, the NLU monitor 180 believes that continued dialog may be conducted with the user which may result in successfully routing and/or processing the user's input communication. This situation may be represented by the following relationship:

$$t1 < P(\text{understanding})$$

As result, the process moves to step 2400 where the NLU monitor 180 stores the dialog exchange into dialog history database 170.

In step 2500, the dialog manager 190 conducts further dialog with the user to obtain clarification of the users initial input communication (exchange 1). In step 2600, if the recognizer 120 and NLU unit 130 can recognize and understand the user's second input communication (exchange 2) so that it can be processed, the process goes to step 2700 and ends. However, if after exchange 2 the user's input communication cannot be understood and processed, the process returns to step 2100 where the recognition and understanding data from the user's second input communication is input to the NLU monitor 180 by the recognizer 120 and the NLU 130. Then in step 2200, the NLU monitor 180 determines the probability of correctly understanding the user's input communication based on both the current exchange 2 and previous exchange 1 retrieved from the dialog history database 165. The process that continues as stated above.

Figure 3:
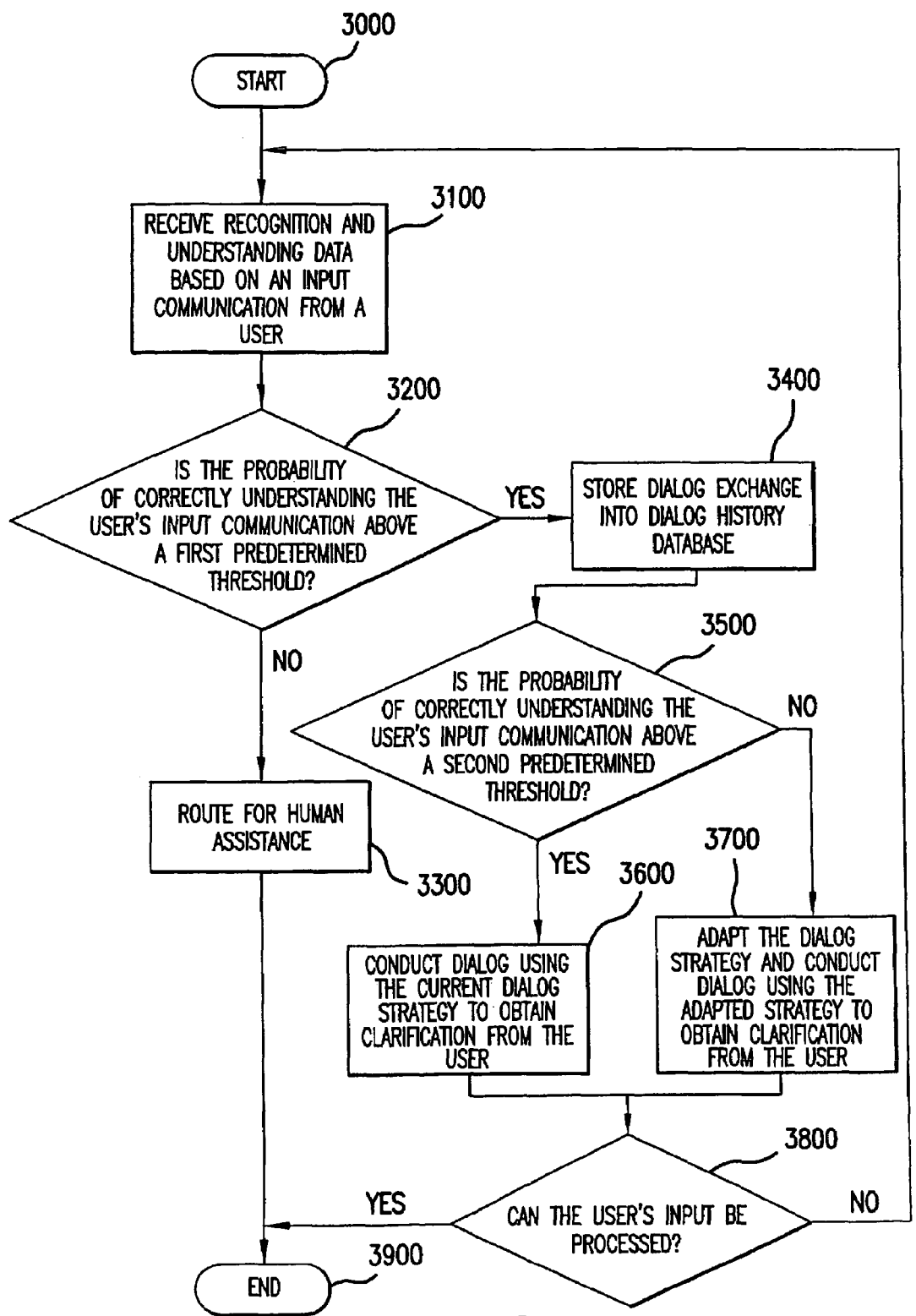
FIG. 3 is a flowchart illustrating another exemplary NLU monitoring process using dialog strategy adaptation techniques.

FIG. 3 is a flowchart of an exemplary natural language understanding monitoring process that allows the dialog strategy to be adapted between dialog exchanges. Steps 3000, 3100, 3200, 3300, and 3400, operate similarly to steps 2000, 2100, 2200, 2300, and 2400 of FIG. 2, respectively, and will not be further discussed.

However, after step 3400 in which the first dialog exchange is stored in the dialog history database 170, in step 3500, the NLU monitor 180 determines whether the probability of correctly understanding the user's input communication exceeds a second threshold. If the NLU monitor 180 determines that probability of probability of correctly understanding the user's input communication exceeds the second threshold, in step 3600, the dialog manager 190 conducts dialog with the user using the current dialog strategy. This situation may be represented by the following relationship:

$$t1 < P(\text{understanding}) > t2$$

However, if the NLU monitor 180 determines that the probability of correctly understanding the user's input communication does not exceed the second threshold, in step 3700, the dialog manager 190 conducts dialog with the user using an adapted (or different) dialog strategy with the user. This situation may be represented by the following relationship:

$$t1 < P(\text{understanding}) < t2$$

The process then proceeds to step 3800, where determination is made whether the user's input communication can be processed based on either the current dialog strategy or the adapted dialog strategy opted for in step 3500. The process that continues similar to FIG. 2 above, and as such, will not be discussed further.

Figure 4:
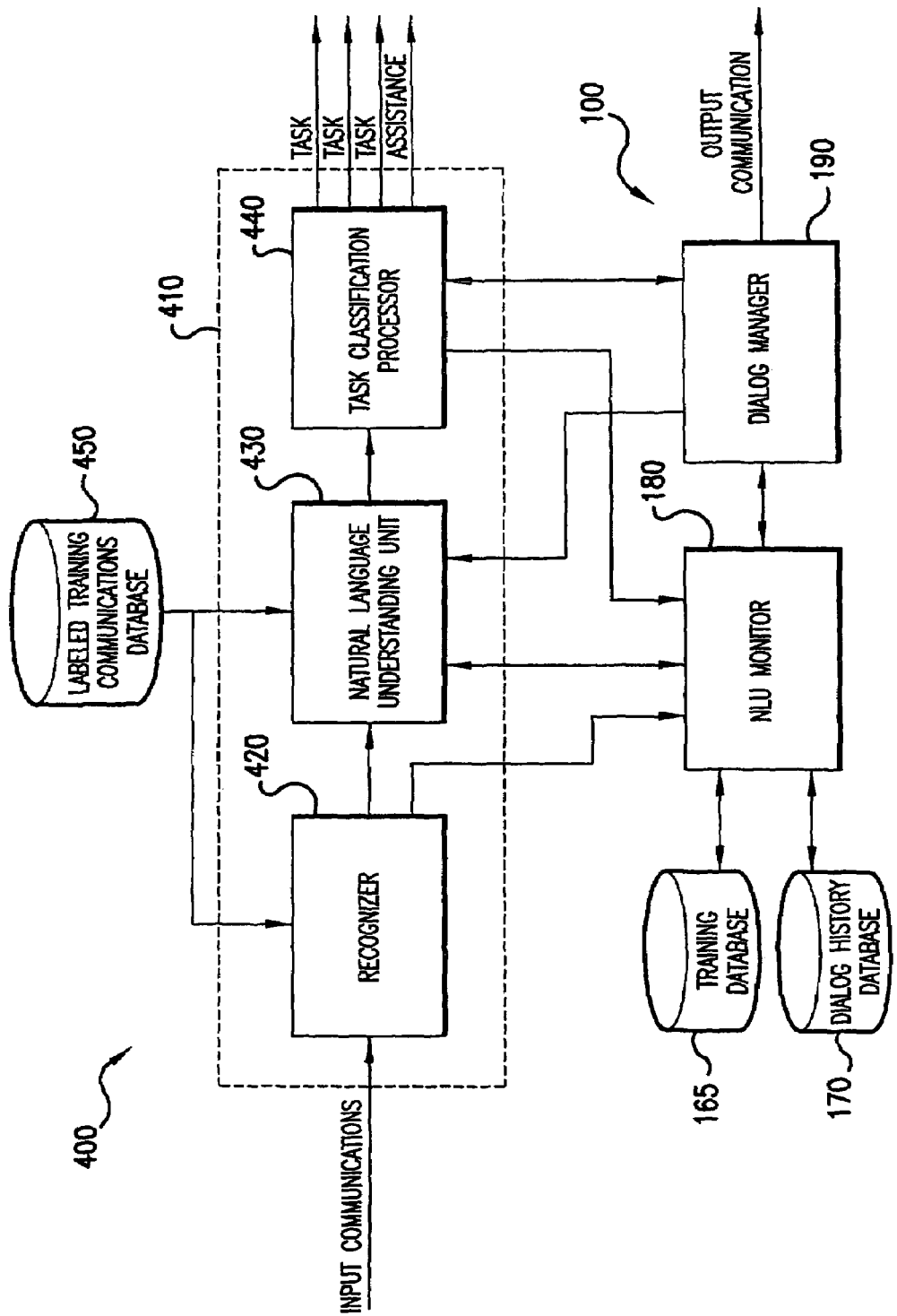
FIG. 4 is a block diagram of an exemplary task classification system using a NLU monitoring system.

FIG. 4 illustrates one possible application of the natural language understanding monitoring system 100. In particular, FIG. 4 shows an exemplary automated task classification system 400 that conducts automated dialog with a user. The automated task classification system 400 includes a classification subsystem 410, a labeled training communications database 450 and a natural language understanding monitoring system 100. The classification subsystem 410 includes a recognizer 420, an NLU unit 430 and a task classification processor 440. The natural language understanding monitoring system 100 includes an NLU monitor 180, a dialog manager 190, a training database 165 and a dialog history database 170, as discussed above.

The automated task classification system 400 is based on the notion of task classification and routing. In the automated task classification system 400, services that the user can access are classified into a plurality of categories by a task classification processor or alternatively, to a category called other for calls that cannot be automated and must be transferred to a human operator. Each category describes a different task, such as person-to-person dialing, or receiving credit for a misdialed number.

The task classification processor 440 determines which task the user is requesting on the basis of the NLU unit's 430 understanding of recognized language segments, stored in the labeled training communications database 450, and recognized by the recognizer 420. The NLU 430 attempts to interpret the user's response to, for example, the open-ended system greeting AT&T, How May I Help You? Once the response has been recognized and understood, task classification processor 440 determines the task, and the information needed for completing the caller's request is obtained using the dialog manager 190. The dialog manager 190 uses sub-modules that are specific for each task.

While the task classification processor 440 and the NLU unit are shown as separate units in FIG. 4, their functions may be performed by a single unit within the spirit and scope of the invention.

Figure 5:
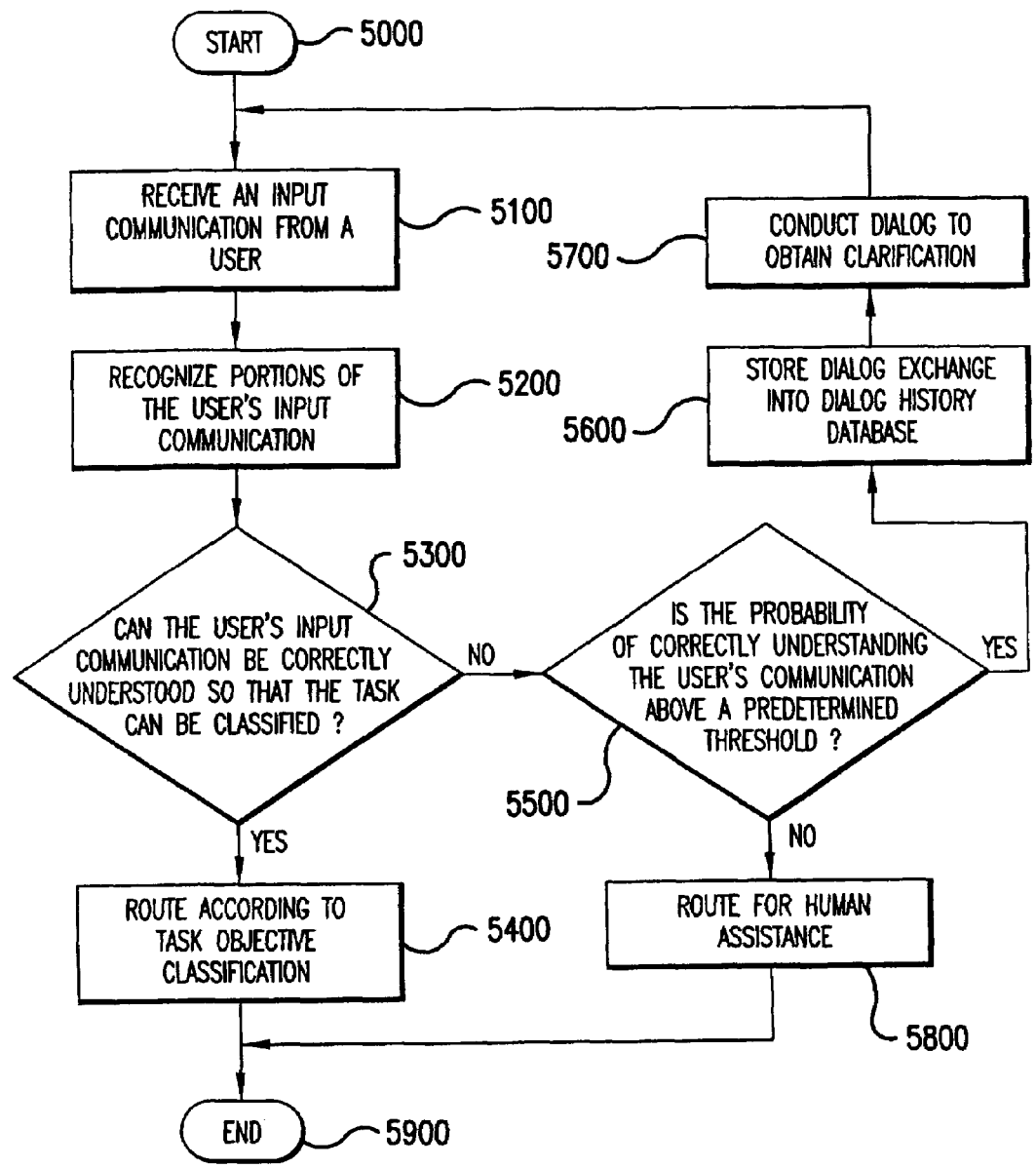
FIG. 5 is a flowchart illustrating an exemplary task classification process using a NLU monitoring process.

FIG. 5 is a flowchart of a possible automated task classification process using the natural language understanding monitoring system 100 of the invention. The process begins at step 5000 and proceeds to step 5100 where an input communication is received by the recognizer 420. At step 5200, the recognizer 420 attempts to recognize portions of the user's input communication, including grammar fragments, meaningful words/phrases/symbols, morphemes, actions, gestures, or any other communication signal.

At step 5300, based on the understanding received from the NLU unit 430, the NLU monitor 180 determines whether the user's input communication can be correctly understood so that the task can be classified. If the task can be classified, then in step 5400, the task classification processor 440 routes the user's request according to the task classification, and the process proceeds to step 5900 and ends.

However, in step 5300, if the NLU monitor 180 determines that the task classification processor 440 cannot classify the user's request, in step 5500, the NLU monitor 180 determines whether the probability of correctly understanding the user's input communication exists above a predetermined threshold. In this iteration, the NLU monitor 180 is using only the first exchange (exchange 1). The NLU monitor 180 uses the classification model stored in the dialog training database 165 to determine whether the probability of correctly understanding the user's input communication exceeds the predetermined threshold. If the NLU monitor 180 determines that the probability of correctly understanding the user's input communication does not exceed the threshold, then in step 5800 the user is routed to a human for assistance. The process then goes to step 5900 and ends.

If, in step 5500, the NLU monitor 180 determines that the probability of correctly understanding the user's input communication is above the predetermined threshold based on the stored classification model, in step 5600 the first dialog exchange is stored in the dialog history database 170. Then, in step 5700, the dialog manager 190 conducts dialog with the user to obtain further clarification of user's request. The process returns to step 5200 wherein the recognizer 420 attempts to recognize portions of the second exchange with the user. Steps 5300 and 5400 are performed as before using the second exchange.

However, in step 5400, if the task classification processor 140 determines that the task cannot be classified, the dialog predictor 180 gauges the probability of conducting successful dialog above the predetermined threshold based on both exchange 2 and exchange 1 stored in the dialog history database 170. If the probability of conducting a successful dialog does not exceed the predetermined threshold based on exchanges 1 and 2, in step 5800, the task classification processor 440 is instructed by the dialog manager 190 to route the user to a human assistant.

On the other hand, in step 5500, if the NLU monitor 180 determines that the probability of correctly understanding the user's input communication exceeds the predetermined threshold, the second dialog exchange may be stored in step 5600 and further dialog conducted with the user in step 5700. The process would continue using the current and previous exchanges with the user until the task is completed or the user is routed to a human assistant.

Figure 6:
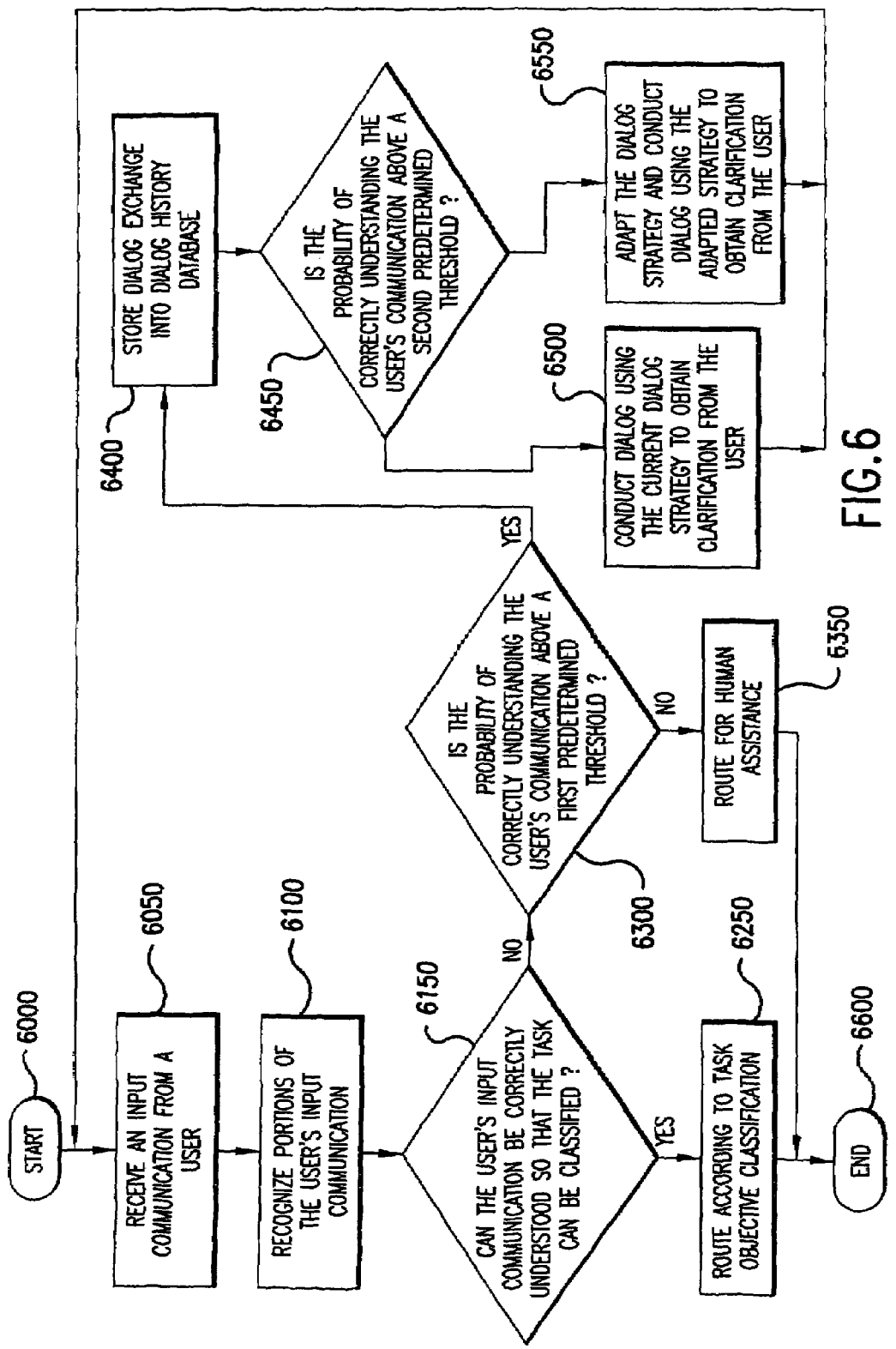
FIG. 6 is a flowchart illustrating an exemplary task classification process using a NLU monitoring process having dialog strategy adaptation techniques.

FIG. 6 is a flowchart of a possible automated task classification process using the natural language understanding monitoring system 100 with the ability to adapt dialog strategy in an effort to conduct successful dialog with the user. Steps 6000, 6050, 6100, 6150, 6250, 6300, 6350, and 6400 operate similarly to steps 5000, 5100, 5200, 5300, 5400, 5500, 5800, and 5600 of FIG. 5, respectively, and will not be discussed further.

However, after step 6400 in FIG. 6 in which the first dialog exchange is stored in the dialog history database 170, in step 6450, the NLU monitor 180 determines whether the probability of correctly understanding the user's input communication exceeds a second threshold. If the NLU monitor 180 determines that the probability of correctly understanding the user's input communication exceeds the second threshold, in step 6500, the dialog manager 190 conducts dialog with the user using the current dialog strategy.

However, if the NLU monitor 180 determines that the probability of correctly understanding the user's input communication does not exceed the second threshold, in step 6550, the dialog manager 190 conducts dialog with the user using an adapted (or different) dialog strategy with the user.

The process then proceeds to back to step 6050, where the recognizer 120 receives the user's input communication based on either the current dialog strategy or the adapted dialog strategy opted for in step 6450. The process that continues similar to FIG. 5 above, and as such, will not be discussed further.

The output of each experiment is a classification model learned from the training data that is stored in the training database 165. The model is evaluated in several ways. First, multiple models are trained using different feature sets extracted from different system 100 components in order to determine which feature sets are having the largest impact on performance. Second, for each feature set, the error rates of the learned classification models are estimated using ten-fold cross-validation, by training on a random 10,608 utterances and testing on a random 1,179 utterances 10 successive times. Third, precision, recall and the confusion matrix are recorded in the classifier, and then trained on all the features tested on a random held-out 20% test set. Fourth, for the classifier trained on all the features, the extent to which the error can be minimized on the error classes RMISMATCH and RPARTIAL-MATCH is examined by manipulating the rule-learning program's loss ratio parameter. Finally, the results of training other learners are compared on the same dataset with several of the feature sets. The overall accuracy results for detecting NLU errors using the rule-learning program are summarized below (SE=Standard Error).

| Features Used | Accuracy | (SE) |
|---|---|---|
| BASELINE (majority class) | 63.47% | |
| ALL | 86.16% | (0.38) |
| NLU UNIT ONLY | 84.80% | (0.38) |
| RECOGNIZER + DISCOURSE | 80.97% | (0.26) |
| RECOGNIZER ONLY | 78.89% | (0.27) |
| DISCOURSE ONLY | 71.97% | (0.40) |

The first line of the above table represents the accuracy from always guessing the majority class (RCORRECT); this is the BASELINE against which the other results should be compared. The first row labeled ALL, shows the accuracy based on using all the features available from the system 100 components. This classifier can identify NLU errors 23% better than the baseline. The second row of the table, NLU ONLY, shows that the classifier based only on the NLU unit 130 features performs statistically as well as the classifier based on all the features. The third row of the table, RECOGNIZER+DISCOURSE shows that combining the RECOGNIZER features with the DISCOURSE features produces a significant increase in accuracy over the use of recognizer 120 features alone, which however still performs worse than the NLU unit 130 features on their own. The last two rows, RECOGNIZER ONLY and DISCOURSE ONLY, indicate that it is possible to do significantly better than the baseline using only the features from the recognizer 120 or from the dialog manager 190 and the discourse history, but these features on their own cannot do as well at predicting NLU accuracy as the NLU unit's 130 own features based on its own calculations.

Using ten-fold cross-validation, the resulting NLU error classifier can correctly identify whether an utterance is an NLU error 86% of the time, an improvement of 23% over the majority class baseline. In addition, the most important features are those that the NLU unit 130 can compute, suggesting that it will be straightforward to integrate the NLU monitor 180 into the NLU unit 130 of the system 100.

Further results are discussed in Walker et al., "Using Natural Language Processing and Discourse Features to Identify Understanding Errors in a Spoken Dialogue System", International Conference on Machine Learning, Jan. 31, 2000, incorporated herein by reference in its entirety.

As shown in FIGS. 1 and 4, the method of this invention may be implemented using one or more programmed processors. However, method can also be implemented on a general-purpose or a special purpose computer, a programmed microprocessor or microcontroller, peripheral integrated circuit elements, an application-specific integrated circuit (ASIC) or other integrated circuits, hardware/electronic logic circuits, such as a discrete element circuit, a programmable logic device, such as a PLD, PLA, FPGA, or PAL, or the like. In general, any device on which the finite state machine capable of implementing the flowcharts shown in FIGS. 2, 3, 5 and 6 can be used to implement the task classification system and natural language understanding monitoring functions of this invention.

While the invention has been described with reference to the above embodiments, it is to be understood that these embodiments are purely exemplary in nature. Thus, the invention is not restricted to the particular forms shown in the foregoing embodiments. Various modifications and alterations can be made thereto without departing from the spirit and scope of the invention.

The invention claimed is:

1. A method, for use in an automated dialog system, of identifying a particular task that a user wishes to have performed based on a dialog with the user, the method being performed if the task has not yet been identified, the method comprising
    conducting further dialog with the user if a probability of being able to identify the task based on further input communication from the user exceeds a first threshold, the further dialog being conducted using a current dialog strategy if said probability exceeds a second threshold greater than said first threshold and being conducted using an adapted dialog strategy if said probability exceeds said first threshold but not said second threshold.

2. The method of claim 1 wherein the probability is determined using recognition and understanding data derived from the user's input communication.

3. The method of claim 1, wherein the adapted dialog strategy includes one of presenting choices to the user.

4. The method of claim 1, wherein the probability is determined using training data stored in a training database, the training data including at least one of classification models and extracted features.

5. The method of claim 4, wherein the extracted features are derived from recognition, understanding and dialog data.

6. The method of claim 1, further comprising:
    storing a first dialog exchange in a dialog history database, wherein the first dialog exchange includes a first automated dialog output and the user's first input communication and the further dialog conducted with the user results in a second dialog exchange, wherein the second dialog exchange includes a second dialog output and the user's second input communication; and
    determining whether the probability of understanding exceeds the first threshold using the first dialog exchange and the second dialog exchange.

7. The method of claim 6, wherein the method is recursive in that the determining step determines whether the probability of understanding the user's input exceeds the first threshold using each of the dialog exchanges conducted.

* * * * *